INVENTORS
ALEC HERVEY BENNETT WALKER,
LESLIE JOSEPH LOCKETT,
BY Robert B Larson
ATTORNEY

United States Patent Office 2,802,158
Patented Aug. 6, 1957

2,802,158

METAL RECTIFIER ASSEMBLIES

Alec H. B. Walker and Leslie J. Lockett, King's Cross, London, England, assignors to Westinghouse Brake and Signal Company Limited, London, England Application May 24, 1954, Serial No. 431,932

Claims priority, application Great Britain May 29, 1953

2 Claims. (Cl. 317—234)

This invention relates to metal rectifier assemblies of the kind in which stacks of rectifier elements are housed in holes formed in a block of insulating material, a thin sheet of insulating material being folded round the block and having formed on the inside surface thereof metallic connections which are held in electrical contact with the stacks of rectifier elements and form the desired internal circuits inter-connecting the several stacks, the whole being housed in a metal casing.

In the assemblies described in the above mentioned co-pending application provision is made for making external electrical connections to the internal circuits by means of individual metal connecting tags assembled in the stacks and projecting through slots communicating with the end holes in the block. The method has the disadvantages that, if the block, and therefore the complete assembly, is to be kept to a minimum size and standard tags used, external electrical connections can conveniently be made only to those stacks of rectifier elements which are adjacent the open ends of the casing, and also that as the individual tags have to be assembled at the same time as the rectifier elements care must be taken to avoid incorrect assembly, which may slow up this operation and may entail the employment of labour which is more skilled than that which would otherwise be necessary for the straight forward operation of assembling the elements alone.

It is an object of this invention to provide improved means for making external electrical connections to the internal circuits and according to the invention metallic connections formed on the inner surface of the folded sheet of insulating material extend to points on at least one fold thereof and metal connectors extend through the sheet at those points and are clamped thereto in electrical contact with said metallic connections.

Preferably the metal connectors are in the form of eyelets provided with projecting tags to which external electrical connections may be made by soldering for example.

The invention is illustrated by way of example in the accompanying drawings in which Figure 1 is a side elevation, partly in section, of one rectifier assembly embodying the invention;

Figure 1:
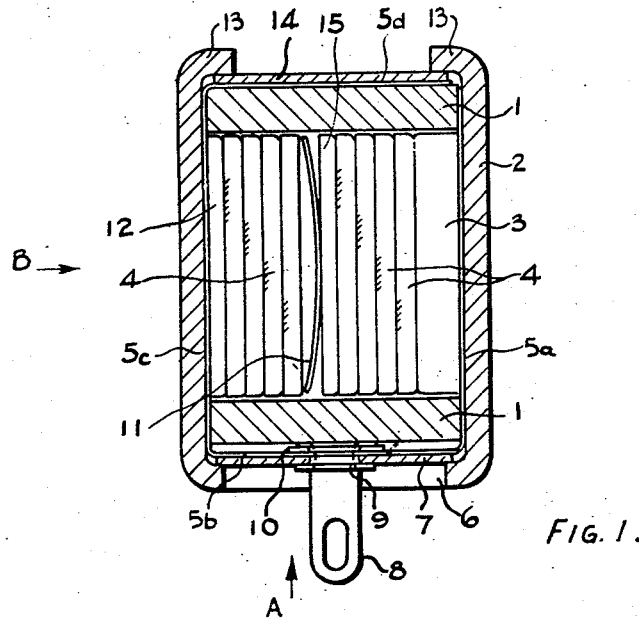
Figure 2:
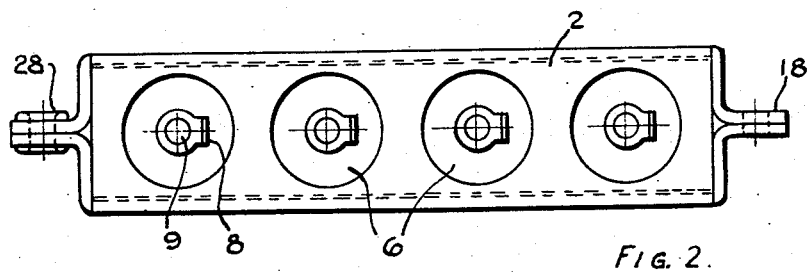
Figure 2 is an end elevation, viewed in the direction of the arrow A, of the assembly of Figure 1 on a reduced scale.
Figure 3:
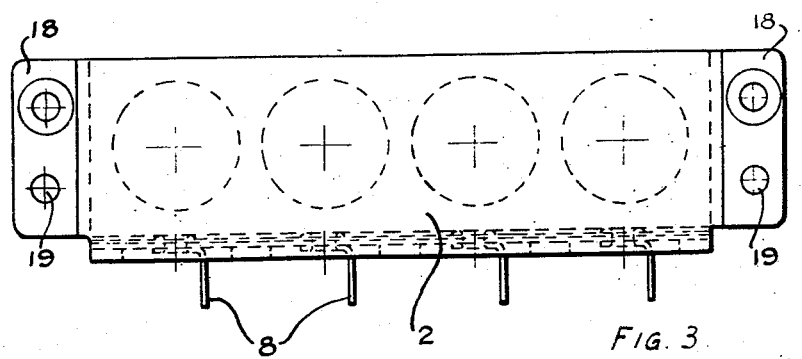
Figure 3 is an elevation viewed in the direction of the arrow B in Figure 1 to the same scale as Figure 2.
Figure 4:
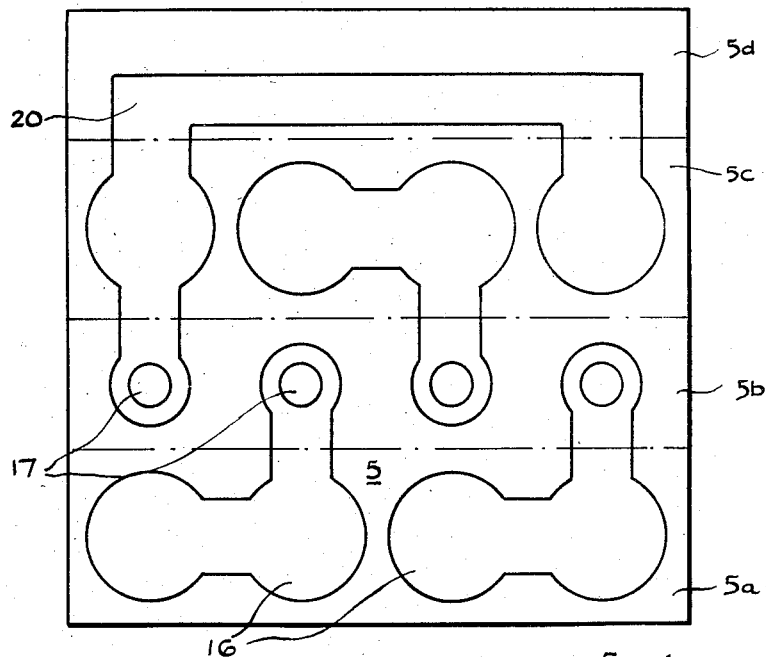
Figure 4 is a view of the thin sheet of insulating material, or circuit card, of the assembly shown in Figure 1 showing the metallic connections and the points of attachment.

Referring first to Figures 1, 2, 3 and 4 the assembly therein shown comprises a casing 2 of suitable metal sheet, such as aluminum, bent to form a box-like container open at one end, the closed end of which is provided with four holes 6. The longitudinal edges of the sheet are bent to form the edges of the container and are provided with outwardly projecting flanges 18 clamped together by eyelets 19.

Housed within the container is a block 1 of insulating material such as that sold under the registered trademark "Perspex" through which extend four holes in each of which is based a stack of metal rectifier elements 4, which may be selenium rectifiers, together with metal spacers 3, 12 and 14 and a spring 11.

Folded around the bock 1 is a circuit card 5 in the form of a thin sheet of insulating material of good thermal conductivity, such as that sold under the registered trademark "Leatheroid." Upon the inner surface of the circuit card are formed metallic connections 16 (Figure 4) which may, for example, be formed of a suitable soft metal or alloy sprayed onto the surface of the insulating sheet through a mask. The circuit card has four zones or sections, namely contact zones 5a and 5c which are held against the apertured surface of the block 1, a first fold 5b between the two contact zones, and a second fold 5d beyond the contact zone 5c. The two folds, in the complete assembly, are held against the longitudinal edges of the block 1. The metallic connections 16 make electrical connection with the stacks housed in the holes in the block 1 and are arranged to provide the required interconnections between the stacks and those with which it is desired to make external contact are extended to points 17 on the fold 5b. At each of these points the circuit card is pierced and a metal contact washer 10 is clamped to the metallic connection 16 by means of a metal eyelet 9 having a projecting tag 8. The tags 8 project through the holes 6 in the closed end of the container 2 and external electrical connections may be made to these tags.

In order to strengthen the circuit card at the fold 5b a relatively stiff strip 7 of insulating material is provided over the outside of the fold and is clamped thereto by the eyelets 9.

The fold 5d of the circuit card is provided for the purpose of carrying the metallic connection 20 between the two end stacks, and if no such interconnection between stacks which cannot be otherwise accommodated on the circuit card are required, then the fold 5d may, of course, be dispensed with. However, if each fold is included a corresponding strip 14 of relatively stiff insulating material, or a metal plate, must be provided to secure the fold 5d and may be held in position by turning over the edges 13 of the container 2. If desired, the internal circuits may be so arranged that certain of the external connections are made to one end of the assembly and others to the other end and it will be evident that in such a case the metallic connections 16 may be extended to points on the fold 5d to which extended connections may be made in a similar manner to that described.

The purpose of the spring 11 is to maintain sufficient pressure between the components to ensure good electrical and thermal contact, it being understood that the material of which the circuit card is made and its thickness are such that while the stacks are electrically insulated from the metal container there is a good transference of heat between them. The semi-conductor layer of metal rectifier elements which may be employed in an assembly of this kind is extremely thin and there may be the danger that the pressure exerted by the spring 11 is sufficient to embed the end element of a stack in the soft metal of the metallic connections on the circuit card sufficiently for the latter to cause a short circuit across the element, and to avoid the danger a metal spacer 12 is placed at the end of each stack.

During assembly the elements, spacers and springs are inserted into the holes in the block in order and it will be appreciated that if the spring is compressed sufficiently to carry out its function when the container is clamped up it will, in its relaxed state, occupy more space in the stack during the assembling and will prevent the last element or spacer from being located in the hole in which it is to be housed. In order to avoid this, and thus to facilitate assembly, blocks made of such a depth that the spring 11 in its relaxed state does not prevent the insertion of the final spacer 3 into its hole, and the final spacer itself is made of such a thickness that the clamping of the container will compress the spring to the desired extent.

It will be noted that in the assembly thus far described the two end spacers of each stack provide a wide area of thermal contact between the stack and the metal container thus ensuring good dissipation of the heat generated in the stacks.

Figure 5:
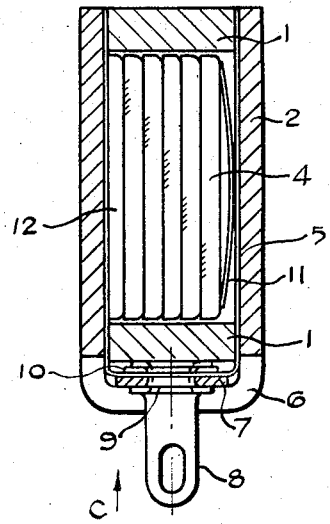
Figure 5 is a side elevation, partly in section, of another embodiment of the invention.
Figure 6:
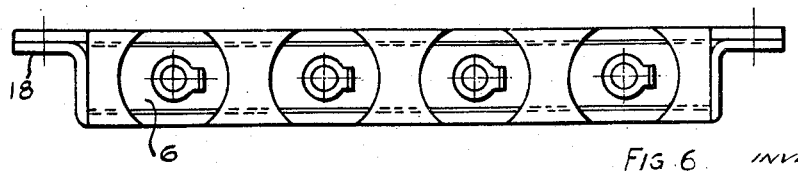
Figure 6 is an end elevation of the assembly shown in Figure 5, viewed in the direction of the arrow C on a reduced scale.

Figures 5 and 6 show a somewhat simpler assembly in which, the internal circuit connections being such that no fold 5d of the circuit card is required, the end plate 14 of Figure 1 is dispensed with and there is accordingly no necessity for turning over the ends 13 of the container 2 it being found that the clamping together of the flanges 18 sufficiently holds the block 1 in place. In this assembly it is assumed that sufficient heat transference will be obtained by means of a good thermal contact between only one end of each stack and the container so that the spring 11 may be located at the other end of the stack, thus avoiding the necessity for the thicker metal spacer 3 and enabling a thinner block 1 to be employed. In all other details of construction the assembly is similar to that described in the foregoing and further description is thus unnecessary.

It will be seen from the foregoing that the invention enables the circuit card to be prepared complete with the connecting tags correctly connected to the metallic connections, thus permitting rapid and easy assembly with a minimum risk of wrong connections, together with a metal container of simple unitary construction and an insulating block of the simplest possible form.

Having thus described our invention what we claim is:

1. A rectifier assembly comprising, in combination, a block of insulating material having a pair of oppositely disposed substantially parallel faces with a plurality of through-extending holes therebetween; a plurality of stacks of metal rectifier elements housed one in each of said holes; a single sheet of insulating material folded round said block and having a first portion extending over one of said faces and a second portion extending over the other of said faces, said first portion and said second portion having a fold between them; metallic connections formed in the inner surfaces of said sheet and extending between said first portion and said second portion across said fold, providing the required circuit connections between said stacks; means for making external electrical connections to said stacks composed of metal connectors extending through said fold and clamped in contact with said metal connections at the points where they cross said fold; and a sheet metal casing around said block.

2. A rectifier assembly comprising, in combination, a block of insulating material having a pair of oppositely disposed substantially parallel faces with a plurality of through-extending holes therebetween; a plurality of stacks of metal rectifier elements housed one in each of said holes; a single sheet of insulating material folded round said block and having a first portion extending over one of said faces and a second portion extending over the other of said faces, said first portion and said second portion having a fold between them; metallic connections formed in the inner surfaces of said sheet and extending between said first portion and said second portion across said fold, providing the required circuit connections between said stacks; means for making external electrical connections to said stacks composed of metal eyelets inserted in said fold and clamped thereto at points thereof crossed by said metallic connections, said eyelets having outwardly projecting tags; and a sheet metal casing clamped around said block.

References Cited in the file of this patent

UNITED STATES PATENTS

| | | |
|---|---|---|
| 2,156,054 | Geisler et al. | Apr. 25, 1939 |
| 2,423,091 | Fiore et al. | July 1, 1947 |